United States Patent Office 2,986,504
Patented May 30, 1961

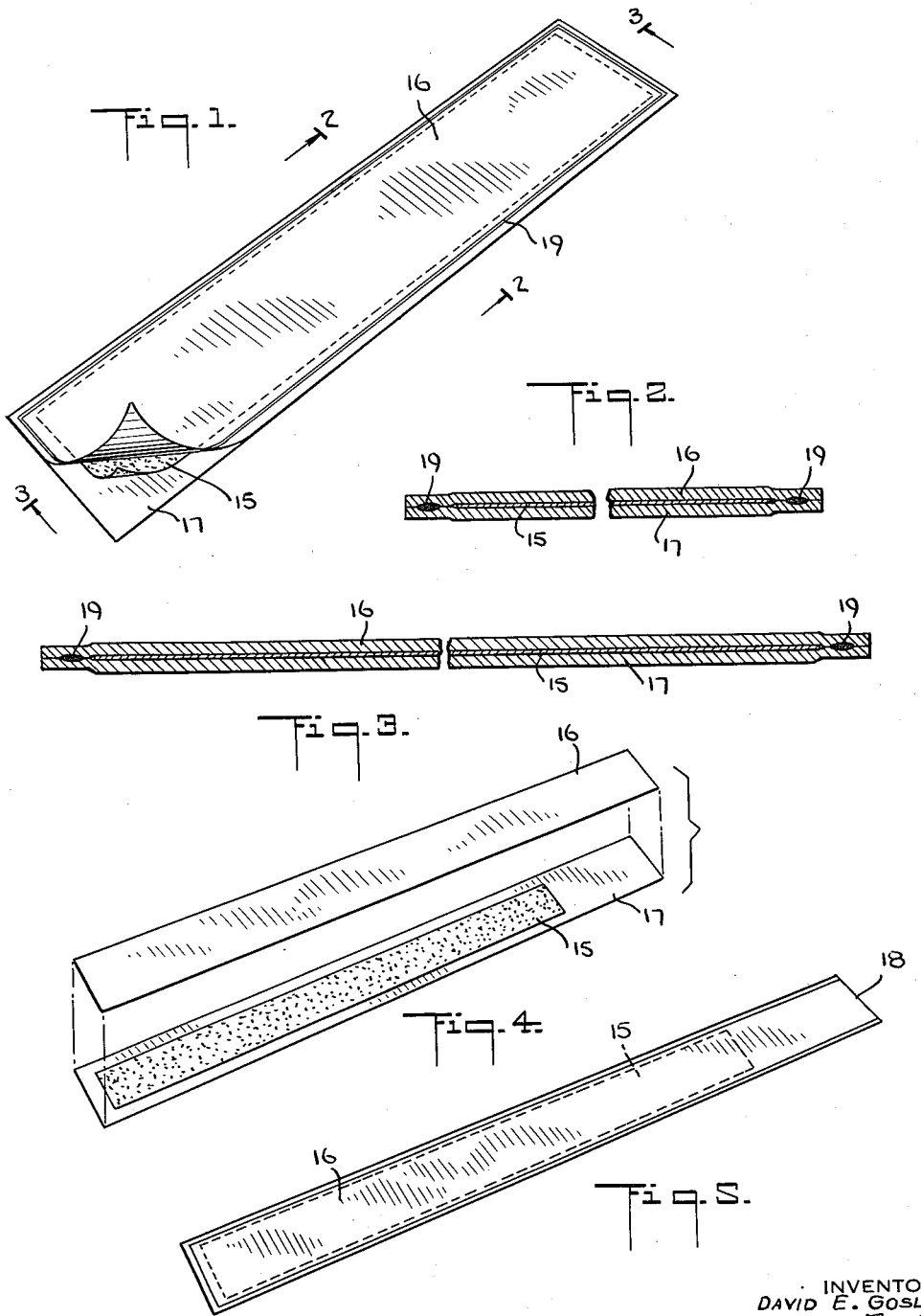

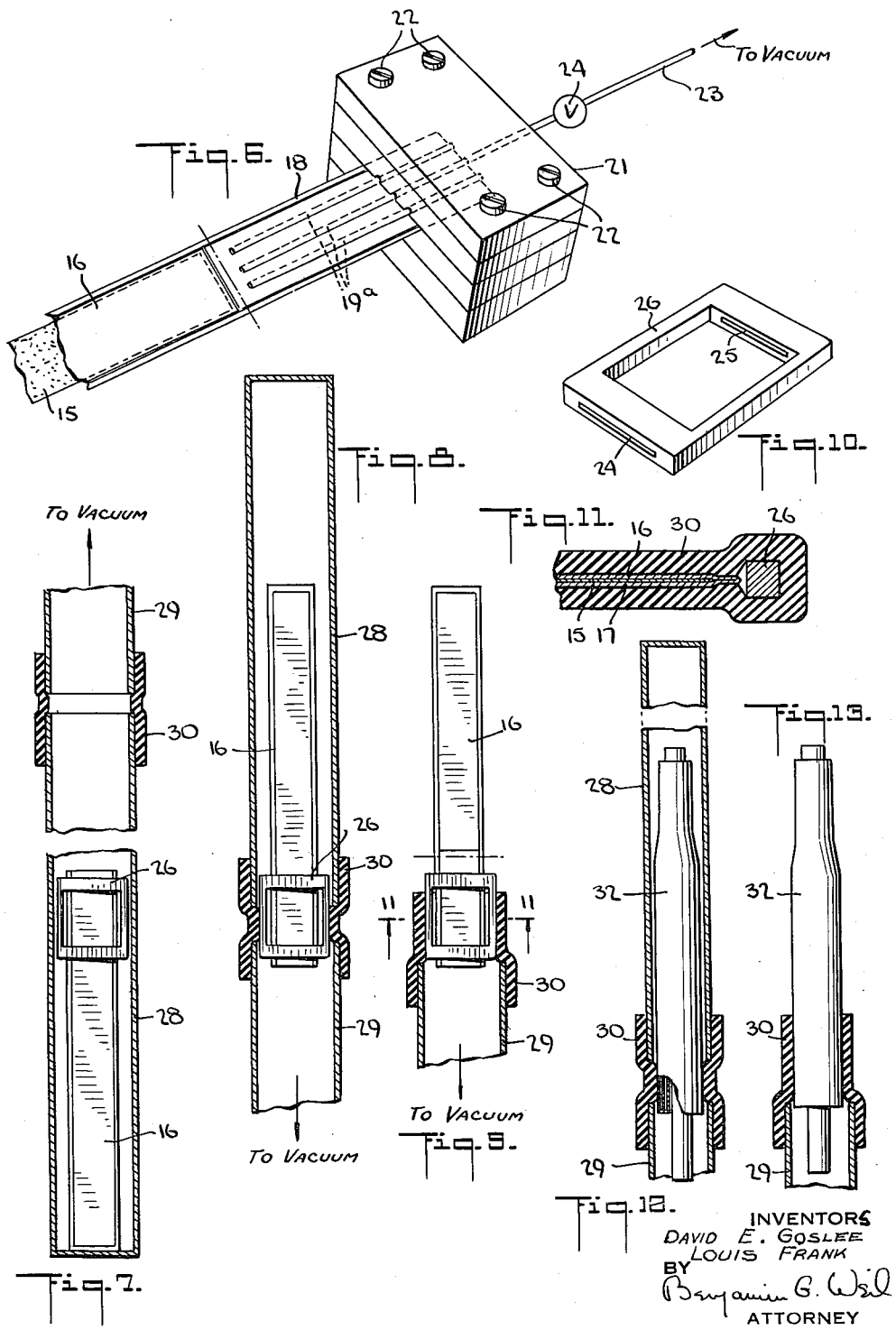

2,986,504

FLAT PLATE TYPE FUEL ELEMENTS

David E. Goslee, Towson, and Louis Frank, Baltimore, Md., assignors to The Martin Company, Middle River, Md., a corporation of Maryland Filed May 23, 1958, Ser. No. 737,376

12 Claims. (Cl. 204—154.2)

This invention relates to flat plate type fuel elements for nuclear reactors, and more particularly to such elements which are unbonded.

Generally, flat plate type elements may be separated into two fabricational classifications; the bonded and unbonded. Bonded flat fuel plates have received wide application in research and are destined for use in commercial reactors. These fuel elements consist generally of four components; a sheet of fuel material which makes up the core, two sheets of cladding and a dead-end picture frame that is positioned around the outside edges of the core between the cladding. These components are fabricated by placing the fuel core within the picture frame and sandwiching these two between the two cladding plates. Then, whether wrought or dispersion types of cores are used, a metallurgical bonding of the cladding to the core and frame is effected by hot rolling or kindred technique. Not only is this process time consuming and costly, but difficulty is also encountered in maintaining the dimensional specifications of the core during the bonding operation. Bonded fuel plates prepared by this technique do however, have good heat transfer characteristics and will contain within the cladding gaseous, liquid or solid radioactive fragments that are generated within the plates during normal operational life of the element.

Unbonded flat plate fuel elements are a second and more economical type. Generally, they comprise the same arrangement of core, cladding and picture frame, if necessary, as hereinabove described in connection with bonded type fuel elements. However, with this unbonded type, the element is sealed without developing a metallurgical bond between the core, cladding and frame. In the past, in order to encase the core within the cladding and prevent leakage of radioactive contamination outside of the fuel element, an organic type of adhesive has generally been employed. In some cases, the core itself has been dip-coated or otherwise fabricated within a plaster body. However, the organic adhesives that have been employed for this purpose have not had sufficient bonding and/or irradiation stability to withstand reactor application for the necessary length of time. In addition, poor heat transfer properties have existed because of the absence of metallurgical bonds between component parts.

For these reasons, known types of unbonded flat plate fuel elements have not been considered for adaptation in power producing reactors and have received little consideration for application in critical experiments which are aimed at securing answers to questions regarding the design of reactors that are difficult to calculate analytically. Such tests can, however, be made with the least expenditure of time and effort on a reactor in which flat plate type fuel elements that are simple to fabricate are utilized. Since the reactor type is disassembled on compleion of the tests, simplicity of construction and easy recovery of the fuel material are desired. The known unbonded types of fuel plates have not been satisfactory for critical experiments primarily because of irradiation damage to the organic adhesives that have been used. In addition, absence of a metallurgical bond between the components of the fuel elements has introduced questions regarding the creation of irradiation hazards during operation of the assembly. Further, the lack of intimate contact between the components would result in poor heat transfer and possible consequent melting or rupture of the cladding during operation of the reactor.

Flat plate fuel elements of the unbonded type, if utilizable, would offer significant savings in the fabricational expenditures of fuel element manufacture. In addition, decreased costs of fuel reprocessing after the useful life of the core has occurred are possible. Furthermore, the costly recovery techniques required with bonded elements generally involving an acid dissolution process to remove cladding from the core of the fuel element are eliminated, because the cladding of unbonded plates can be mechanically stripped from the core.

An object of the present invention is the provision of unbonded type flat plate fuel elements that are practicable for use in critical experimentation and for actual reactor use.

Additional objects and features of the invention are the provision of unbonded type flat plate fuel elements having seals which are stable during irradiation and having an intimate contact between the clad and core which provides good heat transfer at all times.

Other objects and features of the invention are the provision of simple effective manufacturing procedures for producing unbonded flat plate fuel elements having the desired characteristics hereinabove discussed.

Other objects and features of the invention will become apparent from the following specification and the accompanying drawings, wherein:

Figure 1 is an isometric view of the finished flat plate fuel element wherein one corner of the upper clad is turned up to illustrate the relationship between the core and cladding materials;

Figure 2 is a cross-sectional view taken along lines 2—2 of Figure 1;

Figure 3 is a cross-sectional view taken along lines 3—3 of Figure 1;

Figure 4 illustrates the placement of the core section between the two cladding materials;

Figure 5 illustrates the fuel element containing a dead-end section as an intermediate step in the manufacture;

Figure 6 illustrates the attachment of the dead-end section of the fuel element to an adaptor for evacuation of the inside thereof;

Figures 7–9, inclusive, illustrate three steps of an alternate procedure for evacuating the fuel element;

Figure 10 is an isometric detail view of the adaptor employed for holding the fuel element in position in Figures 7–9, inclusive;

Figure 11 is a partial cross-sectional view taken along lines 11—11 of Figure 9; and Figures 12 and 13 illustrate the adaptation of the method shown in Figures 7–9, inclusive, to tubular fuel elements.

In the drawings, and particularly with reference to Figures 1–6, inclusive, a core 15 is placed between two cladding sheets 16 and 17. In this example, the core is composed of uranium metal having a thickness of .001 inch. The cladding sheets 16 and 17 are composed of stainless steel, each having a thickness of .005 inch. The core section 15 is 22 inches long and 2½ inches wide. The core is aligned in the center of the stainless steel clads 16 and 17, with a tolerance of about 0.062 inch in width and 0.125 inch in length. In the finished fuel element, the cladding sheets 16 and 17 are approximately 23 inches in length and 2¾ inches in width. The arrangement of the core 15 relative to the cladding sheets 16 and 17 in the finished product is illustrated in Figure 1. The cladding sheets 16 and 17 at one end 18 of the fuel element are approximately 6 inches longer than the core 15. This is shown in Figure 4. The purpose for this extension 18 will be explained hereinbelow.

After the cladding sheets 16 and 17 and core 15 have been placed in their relative positions, the long sides and the short side opposite extension 18 are seam-welded, producing a vacuum-proof seal. The seam weld 19 is slightly wider in dimension than the thickness of the cladding sheets 16 and 17. The first weld begins at about $\frac{1}{16}$ to $\frac{1}{32}$ of an inch from the edge of the core 15. The fuel plate is inverted and another continuous outside weld is made integrally with the first one, but closer to the edges of the cladding sheets 16 and 17. A broad weld eliminates void volume between the first inside weld and the periphery of the cladding sheets 16 and 17 after the element is trimmed to size. The outside weld is effected on the opposite side of the original weld to prevent stresses from building up in the two seams which might force the element to warp in one direction.

After the three sides of the fuel element have been properly sealed, three $\frac{1}{16}$ inch diameter wires 19a are forced between the cladding sheets 16 and 17 at the unsealed dead-end section 18 until the ends of these wires are approximately ¼ of an inch from the expected position of the final weld at said end 18. These wires 19a prevent the cladding sheets of the dead-end 18 from collapsing toward one another and interfering with the evacuation of gases from the interior of the element.

For the evacuation step, the extension 18 is supported firmly by and locked within a rubber adaptor 21. The adaptor 21 contains four adjustment screws 22 for effecting firm support. A vacuum line 23 is connected to the opposite side of the adaptor 21 and it communicates with the extension 18 for evacuation of the fuel element. The vacuum line 23 contains a control valve 24 for regulating the interconnection of the fuel element with the evacuation apparatus.

In this example, a vacuum of 25 mm. mercury is used for the evacuation of the element. The existence of a vacuum within the element forces the cladding sheets 16 and 17 against the core 15, resulting in an intimate contact therebetween. The degree of vacuum can be varied, for example, a vacuum of about 2 to 100 mm. of mercury may be used. Following the evacuation procedure, the fuel element is completely sealed by seam welds across extension 18 intermediate the ends of wires 19 and core 15. The vacuum within the element is preserved during the final welding treatment. In the next step, the extension 18 is trimmed off, and the other edges of the element are machined or trimmed to meet dimensional specifications.

Alternative schemes can be used for the evacuation of the fuel element. One alternative method is illustrated in Figures 7-11, inclusive. In this method, the extension 18 containing the wires 19a is fitted within the longitudinal slots 24 and 25 of the adaptor 26 shown in Figure 10. The fuel element with the adaptor is placed in a vacuum chamber 28. The vacuum chamber 28 is in turn connceted to a second vacuum chmaber 29 by means of a rubber connector or hose 30. To prevent the adaptor from falling off, as it moves within the chamber 28, it may be cemented or taped to the fuel element. The vacuum assembly is next inverted to permit positioning of the adaptor 26 within the connector hose 30. The chambers 28 and 29 are evacuated, causing restriction of the connector 30 against the adaptor 26. The flexible character of the connector 30 makes it possible to produce a vacuum-proof seal with the adaptor, thus permitting the removal of chamber 28 for assertion of atmospheric pressure against the sides of the fuel element. The remainder of the procedure is similar to that described hereinabove.

The method described in connection with Figures 7-11, inclusive, can also be applied for the evacuation of a tubular fuel element as shown in Figures 12 and 13. As in Figures 7-9, inclusive, vacuum chamber 28 is connected to a second vacuum chamber 29 by means of a connecting hose 30. The tubular fuel element 32 is positioned so that one end is in intimate contact with the connecting hose 30 to form a seal between the two elements. The vacuum chamber 28 is removed, as shown in Figure 13, and the exterior of the fuel element is subjected to atmospheric pressure as the element is being evacuated.

The core 15 may be comprised of a metal, an alloy or a densified powder product in the form of a ceramic or cermet. While uranium metal was used as the fissionable material in the above example, alloys of uranium, such as 90 parts by weight of uranium and 10 parts by weight of niobium or 5 parts by weight of uranium and 95 parts of chromium can also be used. Alternately the core may consist of a ceramic such as uranium dioxide, uranosic oxide, plutonium oxide, thorium oxide, etc. In a cermet core a metal is admixed with the ceramic fissionable material to form a matrix therewith. The powders used to form a ceramic or cermet core have an average particle size of about 200-325 mesh. Densification of the powdered materials is accomplished by standard procedures, for example, rolling, swaging, drawing, sintering, etc. The conditions required for effecting densification are known to those skilled in the art.

The matrix metal and fissionable material powders are mixed thoroughly and then compacted. For high strength cores, the compacts are sintered as explained later. The matrix metal used should preferably have a low thermal neutron absorption cross-section, for example about 0.5 to 5 barns, and may be sinterable. The metal may be the same or different from that of the cladding sheets, because compatible sintering characteristics are not important where metallurgical bonding is not sought.

The practice of the present invention in using a vacuum to force the cladding sheets against the core provides an intimate mechanical bond which is as effective as a metallurgical bond from the standpoint of heat transfer and like characteristics. Specific examples of metals which can be used are aluminum, stainless steel, molybdenum, niobium, etc. The matrix metal, when used, constitutes about 15 to 40% by weight of the mixture containing fissionable material. If desired, the compact of matrix metal and fissionable material can be sintered at a temperature which is well known to those skilled in the art. For example, aluminum can be sintered at a temperature of 550 to 600° C., whereas stainless steel can be sintered at a temperature of 1100 to 1200° C. For the purpose of this specification and the appended claims, the term "metal" designates generically a single metal or a mixture of metals, for example, stainless steel alloys, etc. Sintering is best conducted in the absence of oxygen and for that reason the treatment may be in the presence of hydrogen, a vacuum, an inert gas atmosphere, etc. The time of treatment may be about 0.5 to 2 hours.

The cladding sheets 16 and 17 in the accompanying drawings are stainless steel. For cladding purposes, various metals may be used which have a low thermal neutron absorption cross-section of the same order as explained above in connection with the metal to be used with the fissionable material, for example, about 0.5 to 5 barns. Specific examples of other metals are aluminum, molybdenum, niobium, iron, etc. It should be possible to fabricate the metal into thin sheets of the order of about .001 to .01 inch thickness. The thinness of the clad metal is important in obtaining proper flexing action upon application of the vacuum to the fuel element for procurement of intimate contact with the core. As mentioned above, the mechanical bond created between the core section and the cladding metals is indistinguishable from a metallurgical bond in many respects.

To evaluate the effectiveness of the procedure of the present invention various tests were designed to determine the existence of entrapped gasses within the fuel element, the quality of the welds, the void volume within the elements and the nature of contact between the mated components. In one test the fuel element was immersed in a nitric acid solution, 50% by volume, for 24 hours and then soaked in distilled water having a pH of 8.45 (obtained by the addition of sodium hydroxide) for an additional 65 hours. Thereafter, the element was baked in air at a temperature of 300° C. for 12 hours. Before and after each step, the element was radiographed to examine the core for evidence of chemical attack which may have come about by a leaking weld. At the end of the test, visual and dimensional inspection were employed to observe any swelling or other deformity due to the presence of entrapped gases or leakage. A metallography of the welded joints showed that a molten nugget type weld existed and not merely a solid state recrystallization bond. Furthermore, the fuel element was found to be leak-proof.

A dimensional inspection test was made on the fuel element to determine whether the maximum camber of 0.050 inch was exceeded. The camber is a measure of the deviation from straightness over the length of the fuel element. The measure of camber also checked the presence of any swelling within the element. The camber was measured by laying the fuel element on a flat bed and running a height gauge, set at 0.061 inch above the bed, over the surface of the sample. The camber was good, and there was no evidence of swelling.

The total void volume of the fuel element was measured by water replacement. The theoretical volume was measured by taking the sum of the individual volumes of the three mated sheets of the fuel element. The difference between the volume of water displacement and that obtained theoretically was taken as the amount of void volume. It was found that void volume was less than 3% of the theoretical value. The void areas which are present at the edge of the core, as well as that present between the sheets by reason of the uneven surfaces, amounts to less than 1% of the total theoretical volume of the fuel element.

The intimate contact between the clad and the core was determined by placing the fuel element within a vacuum camber. The atmosphere surrounding the fuel element was evacuated. The pressure of the inside of the fuel element was determined by measuring the point at which the pressure therein exceeded the pressure of the evacuated space surrounding it. A dial gauge attached to the fuel element was employed to measure the point in question by detecting the pressure at which an outward deflection of cladding took place. The pressure necessary to initiate an expansion of the clading was found to be less than 0.5 lb.

The various tests to which the fuel element was subjected verified the suitability of the fuel element for various reactor applications. It appears that the fuel element of the present invention incorporates the advantages which inhere in elements containing a metallurgical bond, without incurring the economic disadvantages. The technique of the present invention is not limited to any size of fuel plate. This indicates that the fuel element can be employed for critical experimentation as well as in low power producing nuclear reactors.

Having thus provided a description of our invention along with specific examples thereof, it should be understood that the scope of the invention is defined by the appended claims.

We claim:

1. A method which comprises placing a sheet of fissionable material between sheets of flexible clad metal to form a sandwich, said clad metal sheets extending beyond said fissionable metal sheet along the entire periphery thereof so as to form a rim area where said clad metal sheets are in direct contact, evacuating the inside of the sandwich, and sealing the edges of the clad metal sheets along said rim area, whereby the fissionable material is enclosed within the clad metal sheets and in intimate contact therewith.

2. The method of claim 1 wherein the clad metal is selected from the group consisting of aluminum, stainless steel, molybdenum, iron and niobium.

3. A method which comprises placing a thin flexible sheet of fissionable material between thin flexible sheets of clad metal to form a sandwich, the sheet of fissionable material being of relatively shorter length and width such that the edges of the sheets of clad metal are in overlapping contacting relationship with each other, one end of said sandwich having the sheets of clad metal overlapping substantially to form a projecting end, placing a plurality of rods between the sheets of clad metal of the projecting end such that the ends thereof are in proximity to the sheet of fissionable material, evacuating the inside of the sandwich at the projecting end, sealing the overlapping edges of the clad metal except that the seal for the projecting end is made between the sheet of fissionable material and the ends of the rods, and removing the projecting end of clad metal beyond the seal, whereby the fissionable material is encased within the clad metal and in intimate contact therewith.

4. The method of claim 3 wherein the clad metal is selected from the group consisting of aluminum, stainless steel, molybdenum, iron and niobium.

5. A method which comprises placing a thin flexible sheet of fissionable material between two thin flexible sheets of clad metal to form a sandwich, the edges of each sheet of clad metal overlapping beyond the edges of the fissionable material and contacting each other to form a rim area, sealing three sides of the sandwich by joining the overlapping edges of clad metal along the rim area and leaving one side open, the seal being in close proximity to the edge of the fissionable material, evacuating the inside of the sandwich through the open side of the sandwich, and sealing the open side along the rim area while maintaining a vacuum inside said sandwich, whereby the fissionable material is encased within the sheets of clad metal and in intimate contact therewith.

6. A method which comprises placing a thin flexible sheet of fissionable material between two thin flexible sheets of clad metal to form a sandwich, the sheet of fissionable material being of relatively shorter length and width such that the edges of the clad metal sheets are in overlapping contacting relationship with each other so as to form a rim area, one end of said sandwich having the sheets of clad metal overlapping substantially to form a projecting end, sealing the overlapping contacting edges of the clad metal along the rim area except the projecting end, evacuating the inside of the sandwich through the projecting end, and sealing the projecting end along the rim area such that the seal is in close proximity to the fissionable material, whereby the fissionable material is encased within the clad metal and in intimate contact therewith.

7. The method of claim 6 being further characterized by placing rods between the sheets of clad metal of the projecting end prior to evacuation so that the ends are in proximity to the fissionable material and the opposite ends are near the edges of the clad metal.

8. The method of claim 1 wherein the clad metal is stainless steel and the fissionable material is uranium dioxide.

9. The method of claim 1 wherein the clad metal is aluminum and the fissionable material is uranium.

10. The method of claim 3 wherein the clad metal is stainless steel and the fissionable material is uranium.

11. The method of claim 5 wherein the clad metal is stainless steel and the fissionable material is uranium dioxide admixed with stainless steel.

12. The method of claim 6 wherein the clad metal is stainless steel and the fissionable material is uranium dioxide admixed with stainless steel.

References Cited in the file of this patent

UNITED STATES PATENTS

| | | |
|---|---|---|
| 2,809,157 | Metcalf | Oct. 8, 1957 |
| 2,820,751 | Saller | Jan. 21, 1958 |

OTHER REFERENCES

International Conference on the Peaceful Uses of Atomic Energy, 1955, vol. 9, pp. 203–207. Copy in Library.

AEC Document WAPD–MRP–66, PWR Report for Dec. 24, 1956 to Feb. 23, 1957, pages 54–55. Copy in Library. Available from OTS, Dept. of Commerce, Washington 25, D.C., price 45¢.

AEC Document WAPD–MRP–68, PWR Report for Apr. 24, 1957 to June 23, 1957, pages 78–80. Available same as WAPD–MRP–66.

Nucleonics, February 1950, page 58. Copy in Library.

AEC Document CF–55–7–76, July 20, 1955. Available from OTS, Dept. of Commerce, Washington 25, D.C., price 25¢. Copy in Library.